US007359774B2

(12) United States Patent
Grenn

(10) Patent No.: US 7,359,774 B2
(45) Date of Patent: Apr. 15, 2008

(54) TELEMATIC SERVICE SYSTEM AND METHOD

(75) Inventor: Daniel P. Grenn, Highland, MI (US)

(73) Assignee: General Motors Corproation, Detroit, MI (US)

( * ) Notice: Subject to any disclaimer, the term of this patent is extended or adjusted under 35 U.S.C. 154(b) by 88 days.

(21) Appl. No.: 11/054,677

(22) Filed: Feb. 9, 2005

(65) Prior Publication Data

US 2006/0190148 A1 Aug. 24, 2006

(51) Int. Cl.
*G06F 11/00* (2006.01)

(52) U.S. Cl. ........................................ 701/29; 340/438

(58) Field of Classification Search .................. 701/29, 701/30, 31, 34, 33, 35; 340/438, 439, 457.4, 340/459, 539.1, 539.24, 426.24; 60/276, 60/277, 285

See application file for complete search history.

(56) References Cited

U.S. PATENT DOCUMENTS

| | | | | |
|---|---|---|---|---|
| 5,442,553 | A * | 8/1995 | Parrillo | 455/420 |
| 6,609,051 | B2 * | 8/2003 | Fiechter et al. | 701/33 |
| 6,677,854 | B2 * | 1/2004 | Dix | 340/438 |
| 6,745,151 | B2 * | 6/2004 | Marko et al. | 702/182 |
| 2004/0172228 | A1 * | 9/2004 | Aragones | 703/8 |
| 2004/0204816 | A1 * | 10/2004 | Dery | 701/113 |
| 2005/0125117 | A1 * | 6/2005 | Breed | 701/29 |
| 2005/0154500 | A1 * | 7/2005 | Sonnenrein et al. | 701/1 |
| 2005/0261816 | A1 * | 11/2005 | DiCroce et al. | 701/36 |
| 2006/0095174 | A1 * | 5/2006 | Sonnenrein et al. | 701/33 |

* cited by examiner

*Primary Examiner*—Dalena Tran

(57) ABSTRACT

A method and apparatus for servicing a vehicle component that includes contacting a remote service center through a telematic module. The method and apparatus also includes diagnosing remotely a vehicle issue and servicing remotely said vehicle issue. Remotely servicing the vehicle saves cost and time when compared to bringing the vehicle to a vehicle service facility.

30 Claims, 9 Drawing Sheets

TELEMATIC SERVICE SYSTEM AND METHOD

FIELD OF THE INVENTION

The present invention relates to engine control and more specifically relates to a remote service system.

BACKGROUND OF THE INVENTION

Throughout the life of a vehicle, the vehicle may require service at a service facility. Taking the vehicle to the service facility may be costly and time consuming. Remote assistance systems typically can include road-side assistance and/or direction assistance. Road-side assistance can include sending a wrecker to the vehicle to assist a driver. Moreover, a service center may suggest a closest service facility to the driver. The driver, however, is still required to drive the vehicle to the service facility. Diagnosing and resolving a vehicle issue without bringing the vehicle to the service facility can save the vehicle user time and expense.

SUMMARY OF THE INVENTION

A method and apparatus for servicing a vehicle component that includes contacting a remote service center through a telematic module. The method and apparatus also includes diagnosing remotely a vehicle issue and servicing remotely said vehicle issue.

In other features, the method and apparatus include communicating with a vehicle user.

In still other features, the method and apparatus includes detecting control module faults through the telematic module.

In yet another feature, the method and apparatus includes actuating a transmission solenoid at a predetermined frequency and magnitude.

Further areas of applicability of the present invention will become apparent from the detailed description provided hereinafter. It should be understood that the detailed description and specific examples, while indicating the various embodiments of the invention, are intended for purposes of illustration only and are not intended to limit the scope of the invention.

BRIEF DESCRIPTION OF THE DRAWINGS

The present invention will become more fully understood from the detailed description, the appended claims and the accompanying drawings, wherein:

DETAILED DESCRIPTION OF THE VARIOUS EMBODIMENTS

The following description of the various embodiments is merely exemplary in nature and is in no way intended to limit the invention, its application or uses. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality. Moreover, vehicle controllers may communicate with various vehicle systems using digital or analog inputs and outputs and/or an automotive communications network including, but not limited to, the following commonly used vehicle communications network standards: CAN, SAE J1850, and GMLAN.

Figure 1:
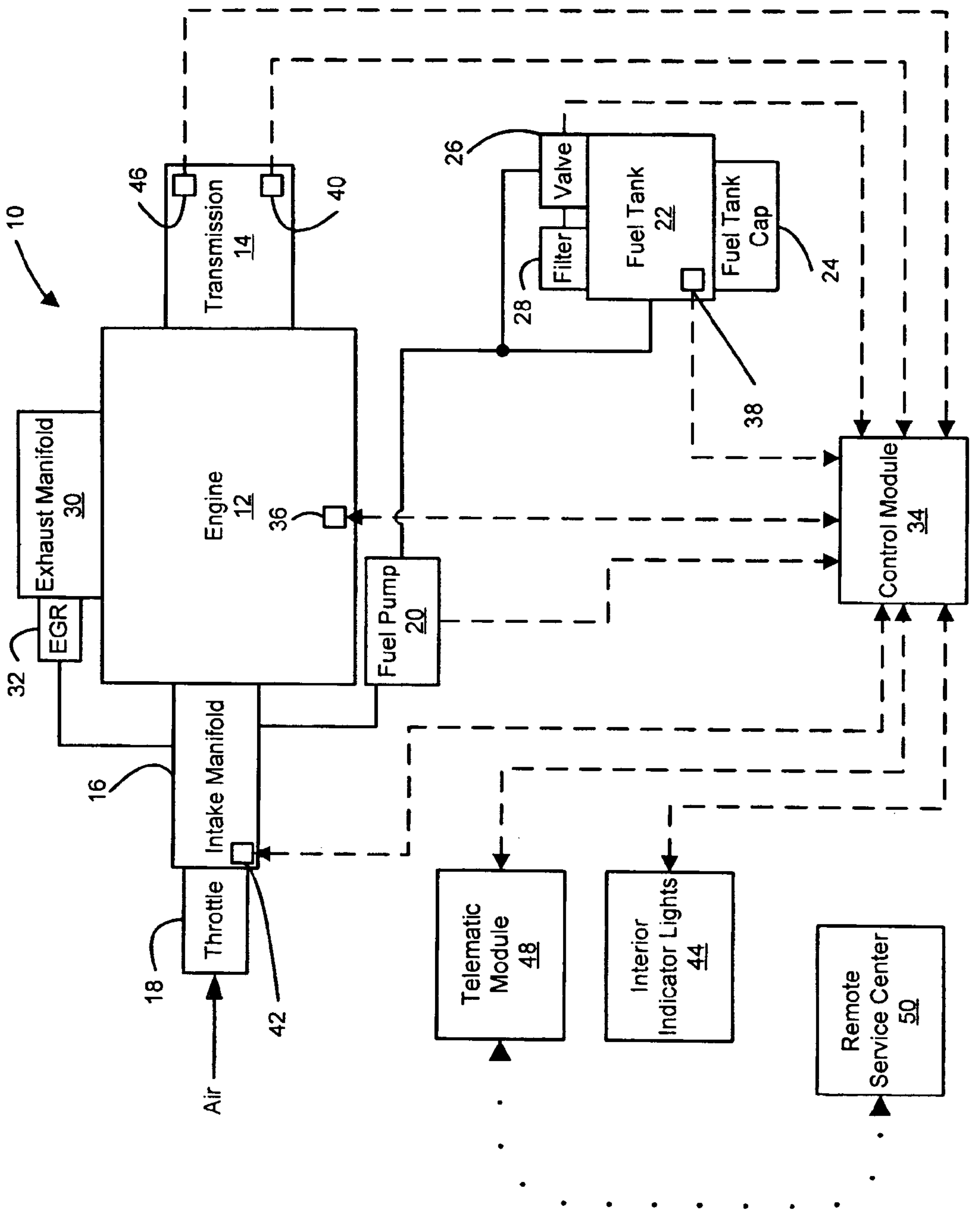
FIG. 1 is a schematic illustration of an exemplary vehicle including remote diagnosis system in accordance with the teachings of the present invention.

Referring now to FIG. 1, an exemplary vehicle 10 includes an engine 12 that produces a torque output to drive the vehicle 10 through a transmission 14. The engine 12 can be an internal combustion engine. It can be appreciated that the engine 12 could also be configured with a variety of configurations such as but not limited to fuel cell and/or battery powered electric machines, internal combustion engines such as diesel, biomass, gasoline and natural gas consuming engines and hybrid combinations thereof.

The engine 12 includes an intake manifold 16 and a throttle 18. The throttle 18 regulates airflow into the intake manifold 16 and further regulates combustion in the engine 12. The engine 12 ignites a mixture of air from the intake manifold 16 and fuel from a fuel pump 20. It can be appreciated that ice, debris and/or contaminants can cause the throttle 18 to not respond in a normal fashion (i.e. an object or debris can obstruct normal throttle deflection).

The fuel pump 20 delivers fuel from a fuel tank 22. The fuel tank 22 includes a fuel tank cap 24 that seals the fuel tank 22. A driver, or other vehicle user, can remove the fuel tank cap 24 to add or remove fuel to or from the fuel tank 22. The fuel tank 22 also includes a purge valve 26 that can maintain suitable vapor pressure levels in the fuel tank 22. The valve 26 can vent excess vapor pressure from the fuel tank 22 to a filter 28. The filter 28 can be, for example, a charcoal filter. It can be appreciated that purge valve 26 can stick and inhibit flow through the valve. Moreover, the fuel tank 22 and a fuel system may not pressure because the fuel tank cap 24 may have not been reattached.

The engine 12 includes an exhaust manifold 30 that routes exhaust gases generated by the combustion process. An engine gas recycling (EGR) valve 32 selectively couples the exhaust manifold 30 and the intake manifold 16. When the EGR valve 32 couples the exhaust manifold 30 to the intake manifold 16, unburned fuel and/or exhaust gas can be re-burned in the engine 12. It can be appreciated that the EGR valve 32 may stick due to debri and/or contamination obstructing the valve 32.

A control module 34 communicates with various components of the vehicle 10. The control module 34 communicates with an engine sensor module 36 that can determine engine speed, engine temperature and/or other suitable engine operating parameters. The control module 34 also communicates with a fuel tank sensor module 38. The fuel tank sensor module 38, for example, can indicate fuel level and/or vapor pressure in the fuel tank 22. The control module 34 communicates with a transmission sensor module 40 that indicates, for example, transmission speed, transmission gear and/or transmission fluid temperature. The control module 34 communicates with an intake manifold sensor 42. The intake manifold sensor 42 can be, for example, a mass airflow (MAF) sensor. The intake manifold sensor 42 responds to the airflow through the intake manifold 16 and, for example, temperature and/or density of the air flowing through the intake manifold 16.

The control module 34 also controls a plurality of interior indicator lights 44. The plurality of interior indicator lights 44 can selectively indicate problems with the vehicle 10. An engine over-temperature light, for example, can indicate that engine temperature is in excess of a normal temperature. An oil pressure low light, for example, can indicate that oil pressure is less than nominal oil pressure. The check engine light can, for example, indicate problems with the combustion process. Problems in the combustion process can include, for example, detection of certain combustion byproducts, which may indicate that service may be necessary. It can be appreciated that the interior indicator lights 44 can be selectively turned on and off to indicate the vehicle's operational status.

The transmission 14 can include one or more solenoids 46. The control module 34 can selectively open and close the solenoids 46. The solenoid 46 can regulate the flow of transmission fluid to various components of the transmission 14. It can be appreciated that the solenoid valves 46 can stick (i.e., not respond in a normal fashion). A stuck solenoid 46 can inhibit certain functions of the transmission 14.

The control module 34 also communicates with a telematic module 48. An exemplary telematic module 46 includes the Onstar® system. The vehicle user can contact a remote service center 50 using the telematic module 48. The remote service center 50 can diagnose and service problems with the vehicle 10 through the telematic module 46 in accordance with the present invention. A remote service method that can be initiated and/or monitored by the remote service center 48 can resolve the vehicle problems. Resolution of the service issue can save the vehicle user a trip to a service facility.

Figure 2:
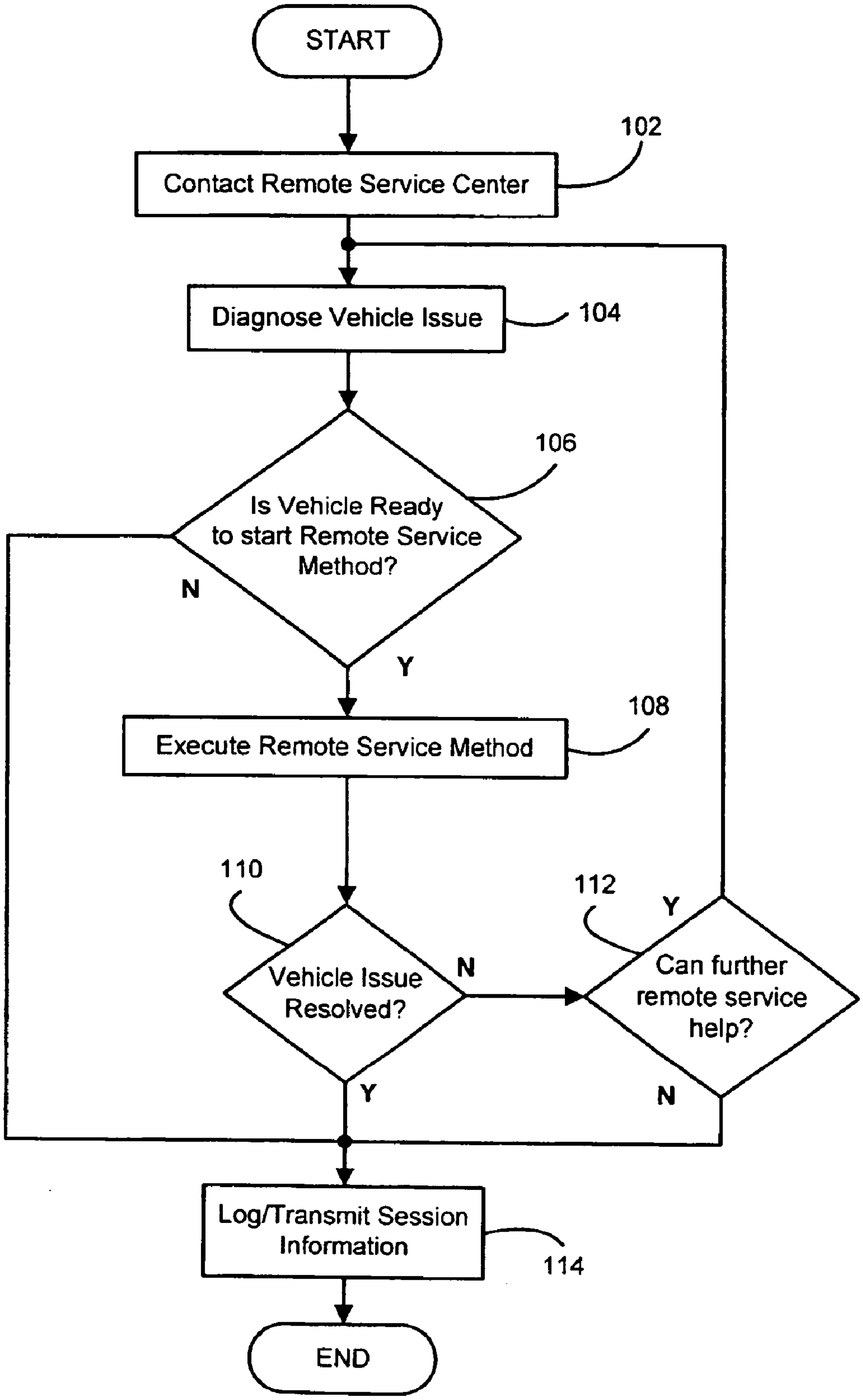
FIG. 2 is a flow chart illustrating exemplary steps executed by the remote diagnosis system of the present invention.

With reference to FIG. 2, an embodiment of an exemplary remote service method is shown that can diagnose and/or resolve an issue or a problem with the vehicle 10 through the telematic module 46. In step 102, the driver contacts the remote service center through the telematic module 46. In step 104, the remote service center diagnoses a vehicle issue. The remote service center can diagnose the vehicle issue by discussing the vehicle issue with the driver and by communicating with the control module 34. It can be appreciated that the telematic module 46 can communicate with the control module 34 in a similar fashion as a technician communicating with the control module 34 in an exemplary service facility. To that end, any service codes, faults or service instructions communicated to the technician in a service facility are otherwise communicated to the driver and/or the remote service center through the telematic module 46.

In step 106, the remote service center determines whether the vehicle is ready for a remote diagnosis. The vehicle is ready for remote diagnosis when, for example, the vehicle is in park, the engine has warmed to typical operating temperatures and/or the parking brake is set. It can be appreciated that each specific vehicle model may require certain actions and/or settings to prepare the vehicle for the remote service method. For example, the driver can turn off/on the vehicle, maintain a certain engine speed and/or turn off/on certain vehicle accessories. When the vehicle is ready for remote diagnosis, control continues with step 108. When the vehicle is not ready for remote diagnosis, control continues with step 114.

In step 108, control executes the remote service method. Some embodiments of the exemplary remote service method are illustrated in FIGS. 3 through 9. It can be appreciated that the portion of the control system as illustrated in FIGS. 3 through 9 are executed in whole and then control resumes with step 110 in FIG. 2. It can also be appreciated that other remote service methods may be executed in whole or in part through the telematic module 46 with or without the assistance of the remote service center 50.

In step 110, control determines whether the vehicle issue, has been resolved. Control can determine that the vehicle issue has been resolved when the symptoms that originally prompted the driver to contact the remote service center 50 are now not present. When the vehicle issue has been resolved, control continues in step 114. When the vehicle issue has not been resolved, control continues in step 112. In step 112, control determines whether further remote service can help resolve the subject issue. The determination of whether further service can help is based on a decision from the remote service center, progress in solving the vehicle issue and/or a possible initial misdiagnosis. It can be appreciated that the remote service center or the driver can decide whether further diagnosis should be performed. When further remote service can help, control loops back to step 104. When further diagnosis cannot help, control continues with step 114.

In step 114, control records all information exchanged through the telematic module 46 and produced during the remote service method. Control transmits the information to the remote service center, which can help, for example, with further diagnosis of the vehicle at the service facility. After step 122, control ends.

Figure 3:
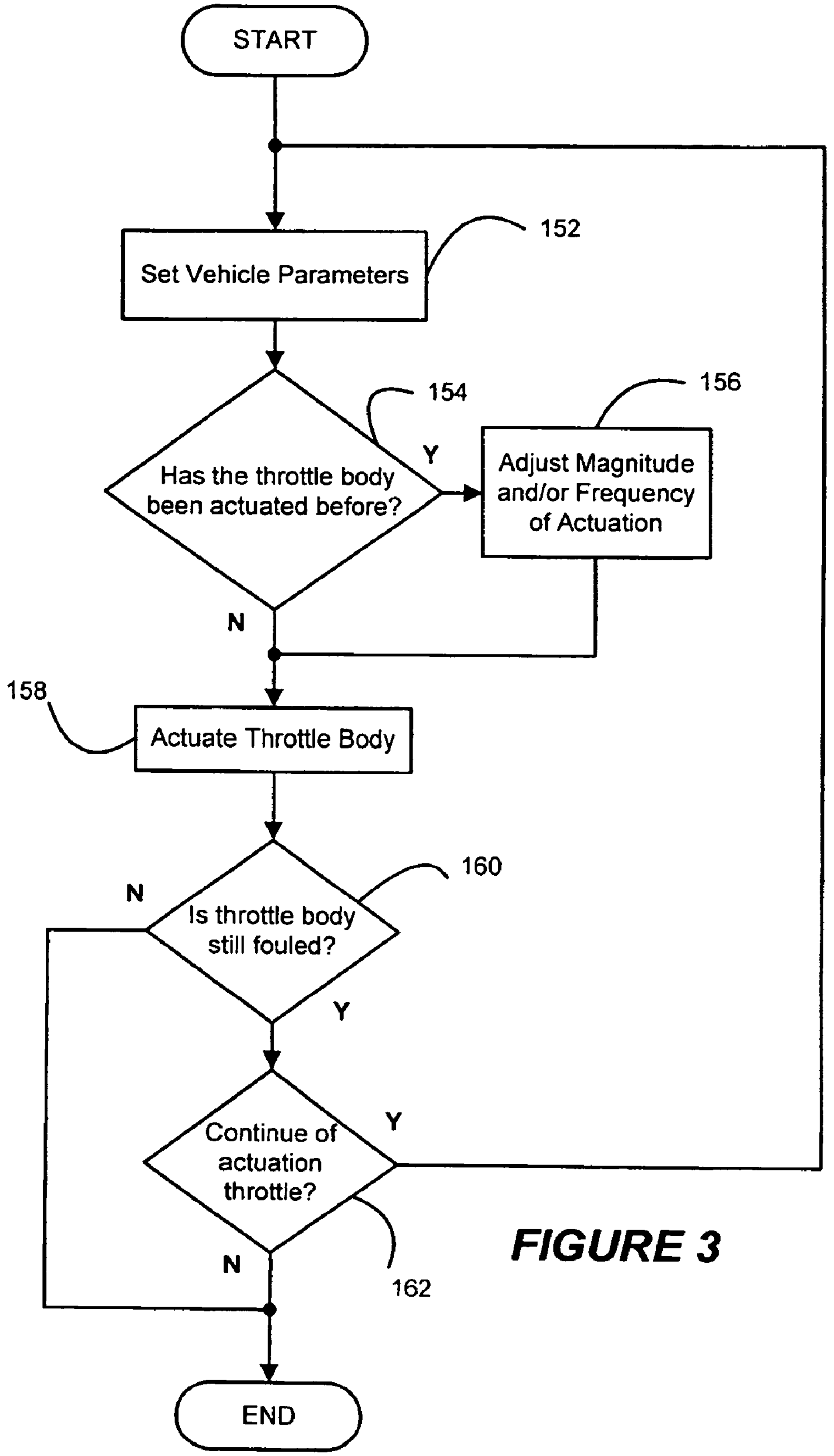
FIG. 3 is a flow chart illustrating exemplary steps executed by the remote diagnosis system to remotely diagnose a throttle body.

With reference to FIG. 3, one embodiment of an exemplary remote service method is illustrated that services a throttle body by actuating the throttle body at a predetermined frequency and magnitude. Actuation of the throttle body can loosen debris, corrosion and/or contamination that can cause the throttle body to stick or otherwise not respond to normal throttle body actuation. In step 152, control sets vehicle parameters. The vehicle parameters are specific to each vehicle model but may include, for example, setting an engine to a predetermined speed, turning on/off certain engine accessories or selecting a certain transmission gear.

In step 154, control determines whether the throttle body has been actuated before in the remote service method. When control determines that the throttle body had been previously actuated, control continues with step 156. When control determines that the throttle body had not been previously actuated in the remote service method, control continues with step 158. In step 156, control can alter the magnitude and/or frequency of actuation of the throttle body.

In step 158, control actuates the throttle body at the predetermined frequency and magnitude. Actuation of the throttle body induces the throttle body to move through a plurality of positions. The actuation can break loose debris that has fouled the throttle body. In cold or high altitude conditions, for example, ice can attach to the throttle body thereby rendering the throttle body less effective. In other examples, the throttle body can be actuated without throttling the engine in any appreciable amount. By way of example, a high frequency pulse can be sent to actuate the throttle body. In other examples, the throttle can be moved from a wide-open throttle position (i.e. a throttle plate is positioned to provide the least amount of obstruction within the throttle body) to a closed throttle position (i.e. the throttle plate is about perpendicular to the flow through the throttle body).

In step 160, control determines whether the throttle body is still not responding in a normal fashion. When the throttle body is still not responding in the normal fashion, control continues with step 162. When control determines that the throttle body is responding in the normal fashion, control ends and resumes with step 110, as shown in FIG. 2. In step 162, control determines whether continued actuation of the throttle body is necessary. When control determines that continued actuation of the throttle body is necessary, control loops back to step 152. When control determines that continued actuation of the throttle body is not necessary, control ends and resumes with step 110, of FIG. 2.

Figure 4:
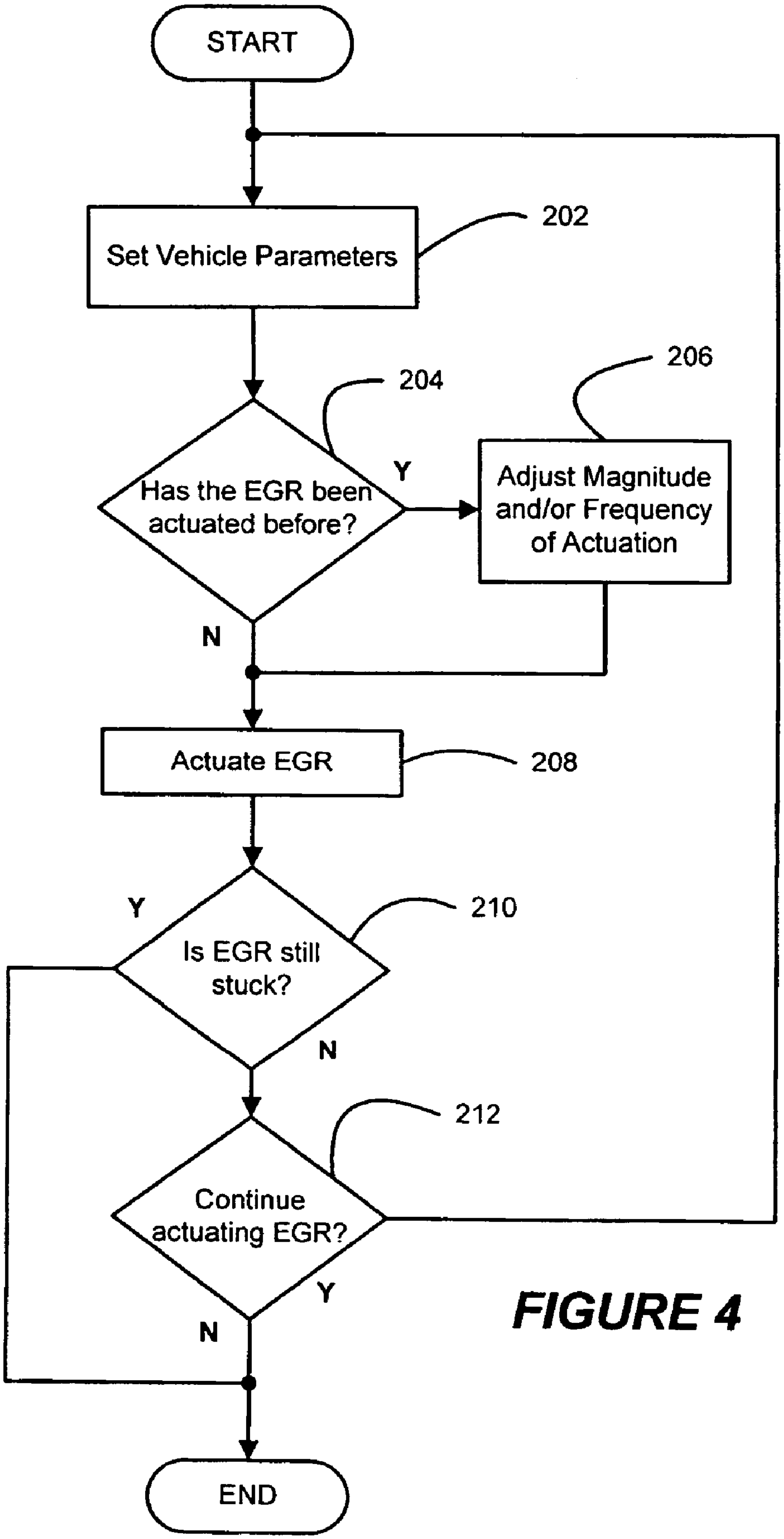
FIG. 4 is a flow chart illustrating exemplary steps executed by the remote diagnosis system to remotely diagnose an engine gas recycling valve.

With reference to FIG. 4, another embodiment of the exemplary remote service method is illustrated that services the EGR valve by actuating the EGR valve at a predetermined frequency and magnitude. The actuation of the EGR valve can loosen debris, corrosion and/or contamination that can cause the EGR valve to stick or otherwise not respond in a normal fashion. In step 202, control sets vehicle parameters. The vehicle parameters are specific to each vehicle model but may include, for example, setting the engine to a predetermined speed, turning on/off certain engine accessories and/or selecting a certain transmission gear.

In step 204, control determines whether the EGR valve has been previously actuated during the remote service method. When control determines that the EGR valve had been previously actuated during the remote service method, control continues in step 206. When control determines that the EGR valve had not been previously actuated during the remote service method, control continues with step 208. In step 206, control can alter the frequency and/or the magnitude of the actuation of the EGR valve. In step 208, control actuates the EGR valve at the predetermined frequency and the predetermined magnitude.

In step 210, control determines whether the EGR valve is stuck (i.e., not responding in the normal fashion). When the EGR valve is responding in the normal fashion, control ends and resumes with step 114. When the EGR valve is not responding in the normal fashion control continues in step 212. In step 212, control determines whether continued actuation of the EGR valve is necessary. The continued actuation of the EGR valve may be warranted, for example, when previous actuation of the EGR valve had caused an improved response from the EGR valve but had not restored the EGR valve to the normal response. When control determines that continued actuation of the EGR valve is necessary, control loops back to step 202. When control determines that continued actuation of the EGR valve is not necessary control ends and resumes with step 110 as shown in FIG. 2.

Figure 5:
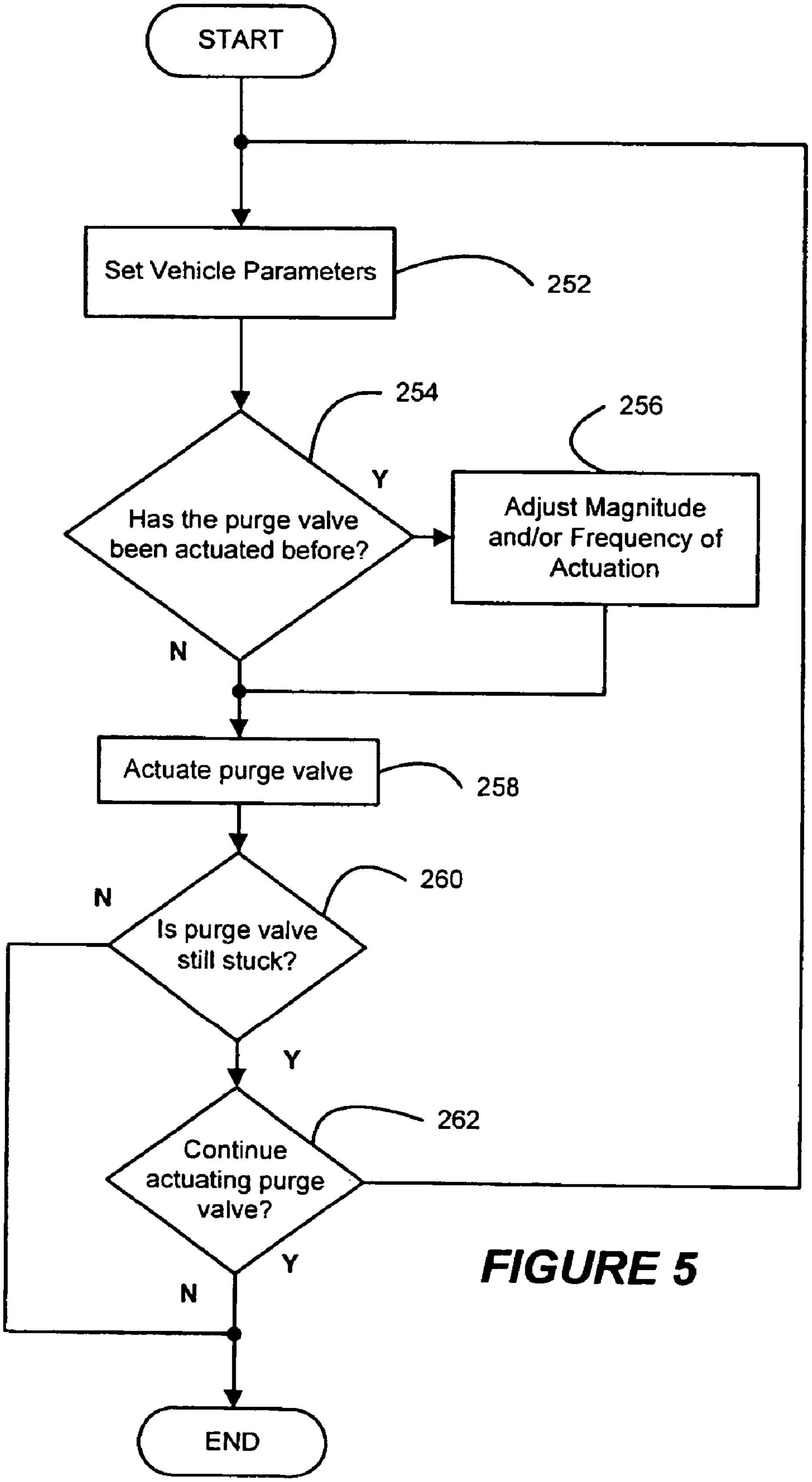
FIG. 5 is a flow chart illustrating exemplary steps executed by the remote diagnosis system to remotely diagnose a fueling system purge valve.

With reference to FIG. 5, another embodiment of the exemplary remote service method is illustrated that services the fuel system purge valve 26 (FIG. 1) by actuating the purge valve at a predetermined frequency and magnitude. The actuation of the purge valve 26 can loosen debris, corrosion and/or contamination that can cause the purge valve 26 to stick or otherwise not respond (i.e., in a normal fashion). In step 252, control sets vehicle parameters. The vehicle parameters are specific to each vehicle model but may include, for example, setting the engine to a predetermined speed, turning on/off certain engine accessories or selecting a certain transmission gear.

In step 254, control determines whether the purge valve 26 has been previously actuated during the remote service method. When control determines that the purge valve 26 has been previously actuated during the remote service method, control continues in step 256. When control determines that the purge valve 26 has not been previously actuated during the remote service method, control continues with step 258. In step 256, control can alter the magnitude and/or frequency of the actuation of the purge valve 26. In step 258, control actuates the purge valve at the predetermined frequency and the predetermined magnitude.

In step 260, control determines whether the purge valve 26 is still not responding in the normal fashion. When control determines that the purge valve 26 is responding in the normal fashion, control ends and resumes with step 110, as shown in FIG. 2. When control determines that the purge valve 26 is not operating normally, control continues in step 262. In step 262, control determines whether continued actuation of the purge valve 26 is necessary. The continued actuation of the purge valve 26 may be warranted, for example, when previous actuation of the purge valve 26 had caused an improved response from the purge valve 26 but had not restored response in the normal fashion. When control determines that continued actuation of the purge valve 26 is not necessary control ends and resumes with step 110, as shown in FIG. 2. When control determines continued actuation of the purge valve 26 is necessary, control loops back to step 252.

Figure 6:
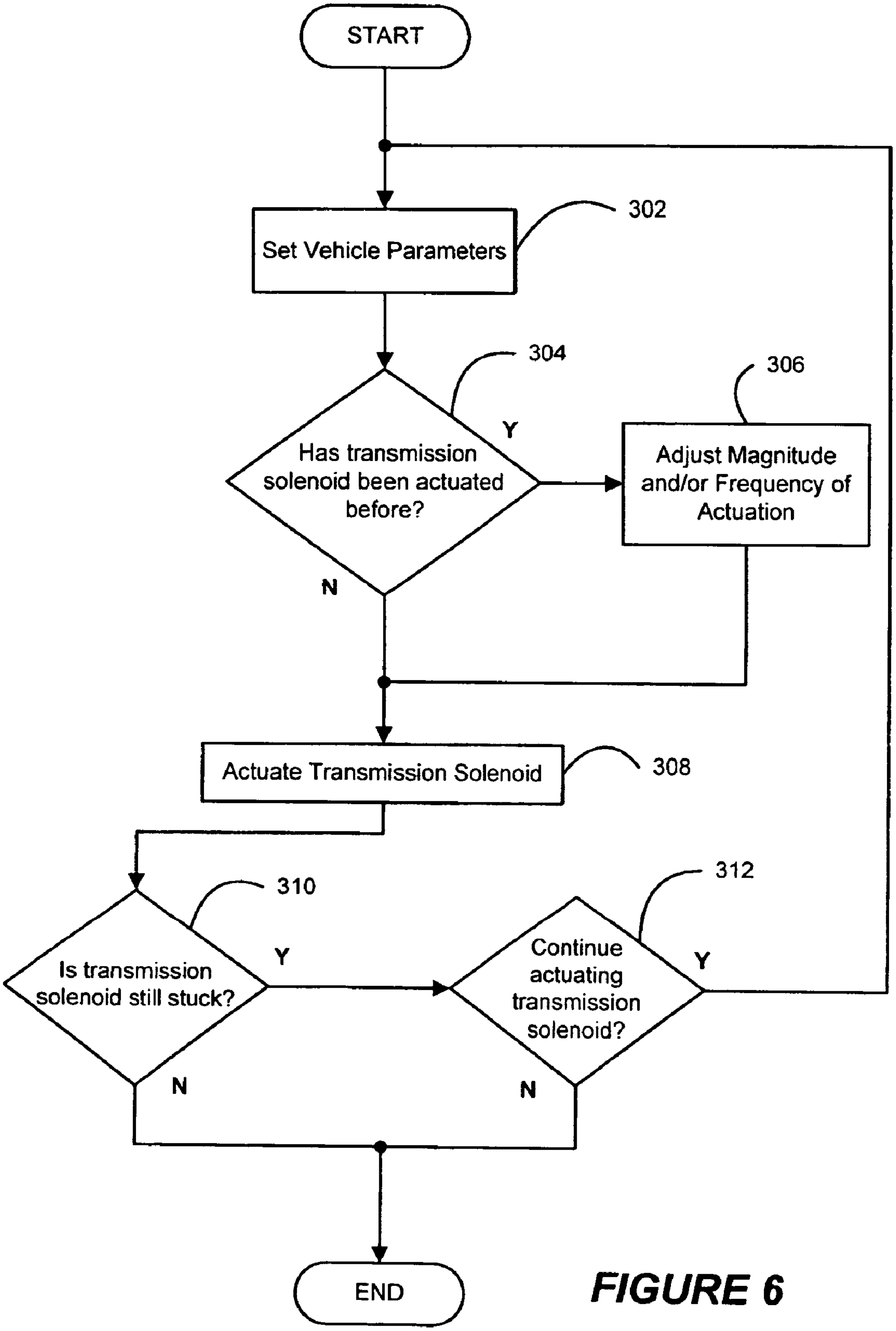
FIG. 6 is a flow chart illustrating exemplary steps executed by the remote diagnosis system to remotely diagnose a transmission solenoid.

With reference to FIG. 6, another embodiment of the exemplary remote service procedure is illustrated that services the transmission solenoid 46 by actuating the solenoid 46 at a predetermined frequency and a predetermined magnitude. The actuation of the solenoid 46 can loosen debris, corrosion and/or contamination that can cause the solenoid 46 to stick (i.e., not respond in a normal fashion). It can be appreciated the present invention can service other solenoids in the vehicle 10. In step 302, control sets vehicle parameters. The vehicle parameters are specific to each vehicle model but may include, for example, setting the engine to a predetermined speed turning on/off certain engine accessories or selecting a certain transmission gear.

In step 304, control determines whether the transmission solenoid has been previously actuated during the remote service method. When control determines that the transmission solenoid 46 has been previously actuated during the remote service method, control continues with step 306. When control determines that the transmission solenoid 46 has not been previously actuated during the service method, control continues with step 308. In step 306, control can alter the frequency and/or magnitude of the actuation of the transmission solenoid 46. In step 308, control can actuate the transmission solenoid 46 at the predetermined magnitude and frequency to return the solenoid 46 to responding in a normal fashion.

In step 310, control determines whether the transmission solenoid 46 is not operating in a normal fashion. When control determines that the transmission solenoid 46 is still not operating in a normal fashion, control continues with step 312. When control determines that the transmission solenoid 46 is operating in a normal fashion, control ends and resumes with step 110, as shown in FIG. 2. In step 312, control determines whether continued actuation of the solenoid 46 is necessary. Continued actuation of the solenoid 46 may be warranted, for example, when previous actuation of the solenoid 46 had caused an improved response from the solenoid 46 but had not restored the solenoid 46 to responding in a normal response. When control determines that continued actuation of the solenoid 46 is no longer necessary control ends and resumes with step 110, as shown in FIG. 2. When control determines that continued actuation of the solenoid 46 is necessary, control loops back to step 300.

Figure 7:
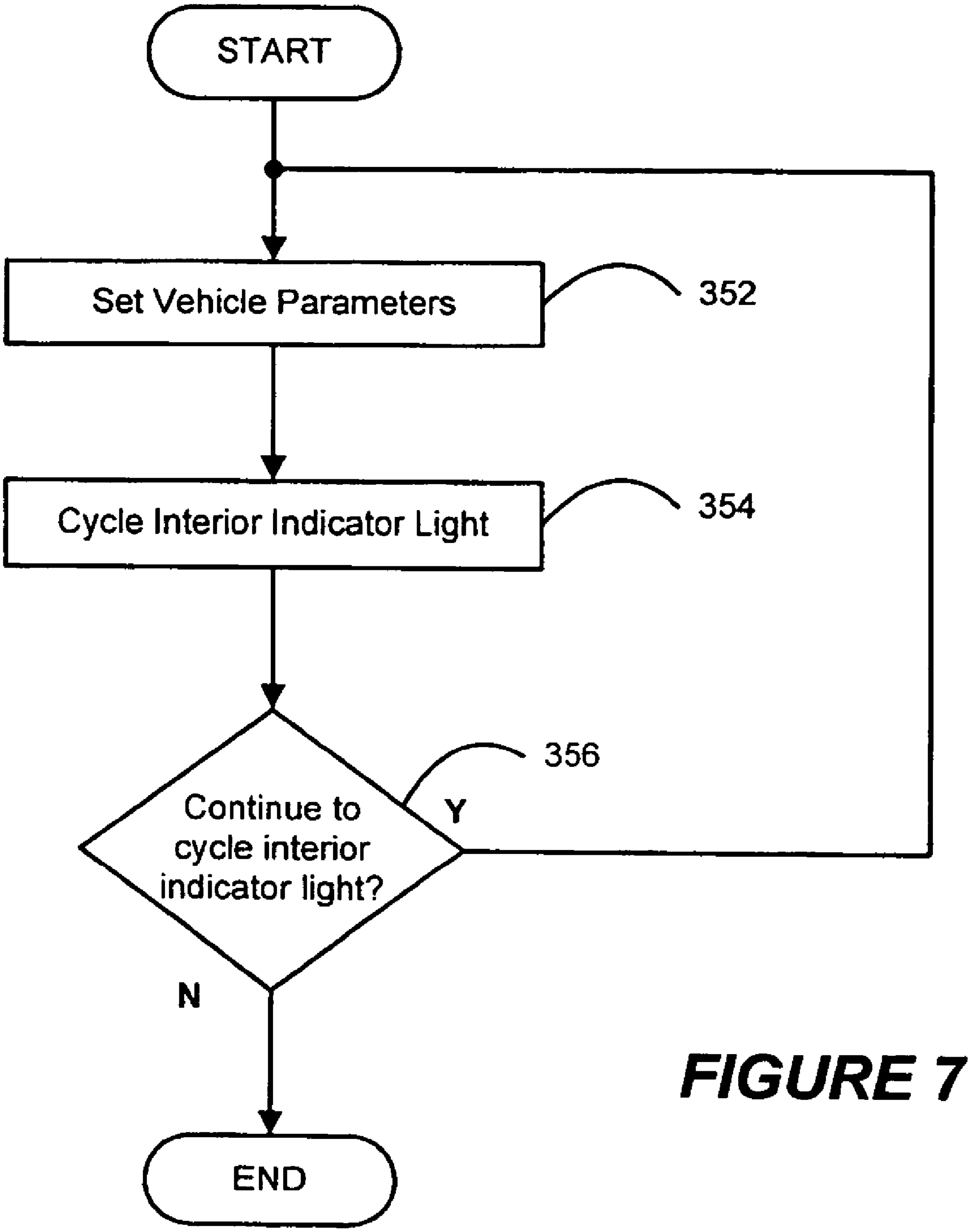
FIG. 7 is a flow chart illustrating exemplary steps executed by the remote diagnosis system to remotely diagnose an interior indicator light.

With reference to FIG. 7, another embodiment of the exemplary remote service procedure is illustrated, that cycles the interior indicator lights 44 by switching them on and off. The cycling of the indicator lights 44 can determine, for example, whether there is a problem with the interior indicator lights 44 themselves separate from the systems with which the lights 44 indicate problems. By way of example, one or more of the interior indicator lights 44 can be cycled on and off to determine whether the interior indicator lights 44 are responding in a normal fashion. In step 352, control sets vehicle parameters. The vehicle parameters are specific to each vehicle model but may include, for example, setting the engine to a predetermined speed, turning on/off certain engine accessories or selecting a certain transmission gear.

In step 354, control can cycle one or more of the interior indicator lights 44. In step 356, control determines whether continuing to cycle the interior indicator lights 44 is necessary. When control determines that continued cycling of the interior indicator lights 44 is no longer necessary, control ends and resumes with step 110, as shown in FIG. 2. When control determines that continued cycling of the interior indicator lights 44 is necessary, control loops back to step 352.

Figure 8:
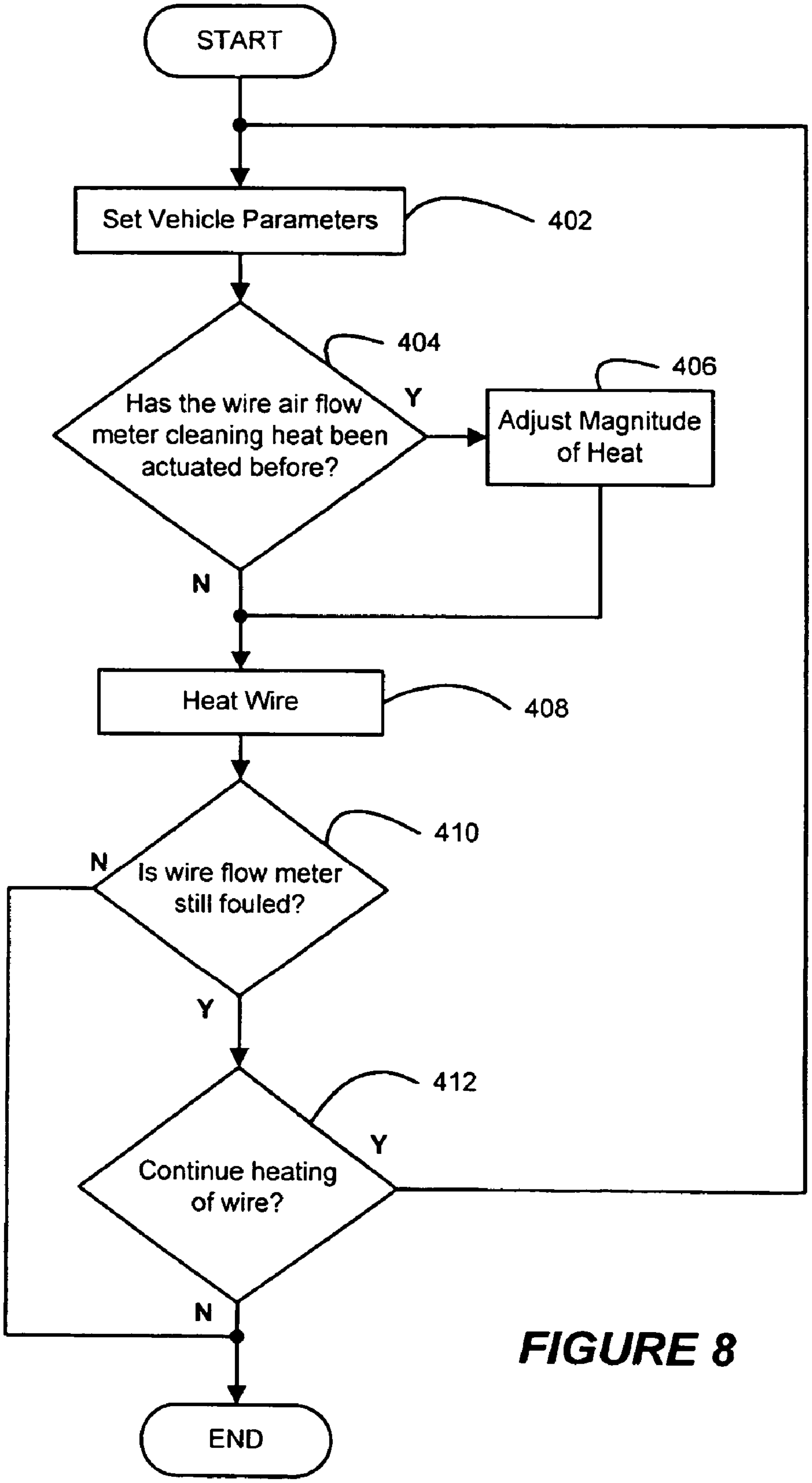
FIG. 8 is a flow chart illustrating exemplary steps executed by the remote diagnosis system to remotely diagnose a hot-wire airflow sensor.

With reference to FIG. 8, another embodiment of the exemplary remote service procedure is illustrated that services a hot-wire airflow meter. The service of the hot-wire airflow meter includes heating a wire in the hot wire airflow meter to burn off debris. It can be appreciated that the hot-wire airflow meter measures airflow by detecting a current through the wire. A constant voltage is supplied to the wire and as airflow changes over the wire, the resistance to the current will change due to the cooling effect of the airflow As such, a measured current can be calibrated, as proportional to airflow velocity over the wire.

In step 402, control sets vehicle parameters. The vehicle parameters are specific to each vehicle model but may include, for example, setting the engine to a predetermined speed, turning on/off certain engine accessories or selecting a certain transmission gear. In step 404, control determines whether the hot-wire airflow meter has been previously serviced during the remote service method. When control determines that the hot-wire airflow meter has been serviced previously, control continues in step 406. When the hot-wire airflow meter has not been serviced previously, control continues in step 408. In step 406, control can alter the magnitude of the current applied to the hot-wire airflow meter. Increased current (i.e., greater than the service current) through the wire can burn off excessive accumulation of debris, corrosion and/or contamination.

In step 408, control increases the current through the wire in an attempt to clean the hot-wire airflow meter. In step 410, control determines whether continued servicing of the hot-wire airflow meter is necessary. Continued heating of the hot-wire airflow meter may be warranted, for example, when previous heating of the wire had caused an improved response from the hot-wire airflow meter but had not restored the hot-wire airflow to responding in a normal fashion. When control determines that continued heating of the wire is not necessary, control ends and resumes with step 110, as shown in FIG. 2. When control determines that continued heating of the wire is necessary, control loops back to step 402.

Figure 9:
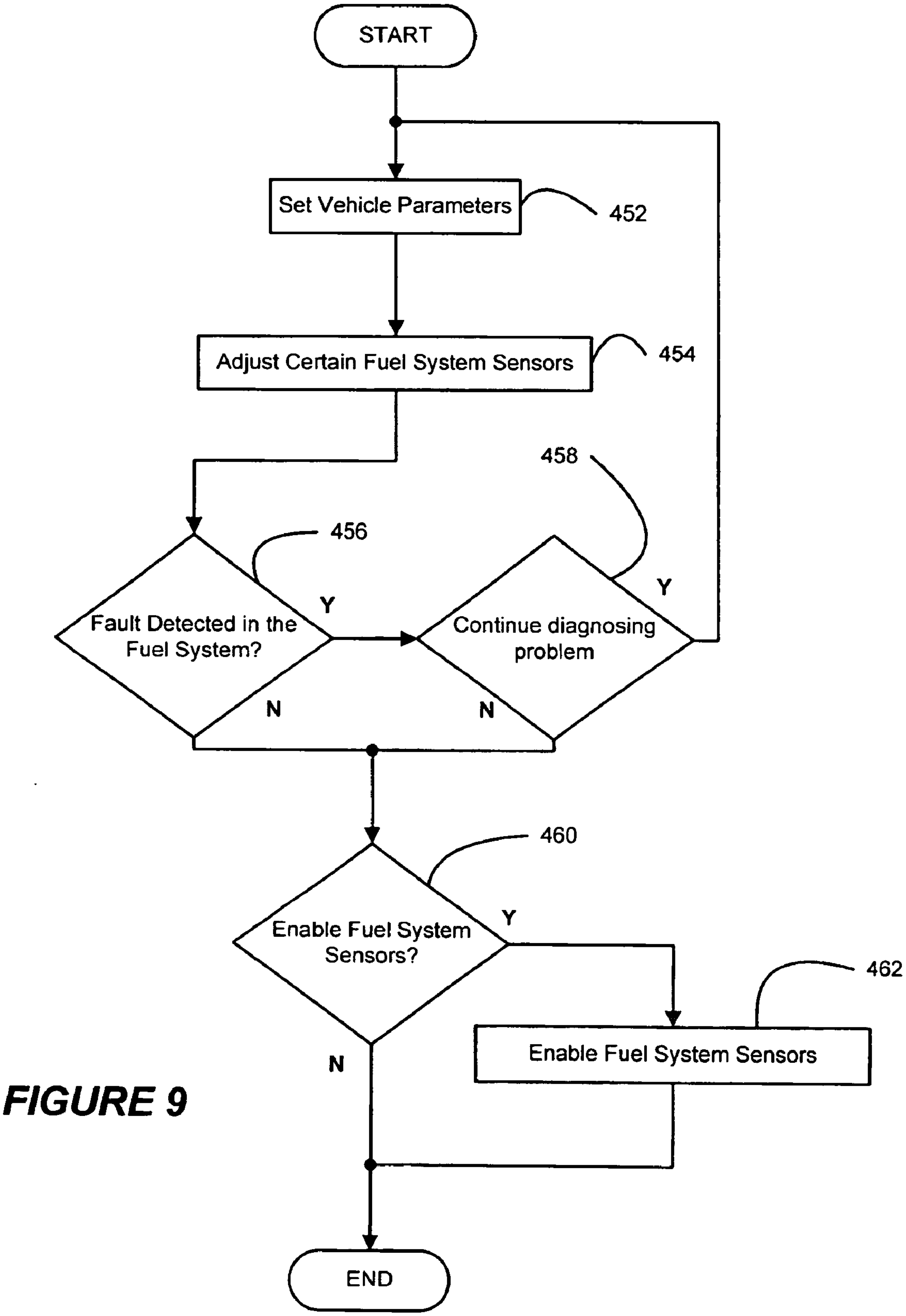
FIG. 9 is a flow chart illustrating exemplary steps executed by the remote diagnosis system to remotely diagnose a fueling system.

With reference to FIG. 9, another embodiment of the exemplary remote service procedure is illustrated, that services a low pressure condition in the fuel system. When the fuel tank cap 24 is not attached to the fuel tank 22, the fuel tank 22 and fuel pump 20 may not be able to fully pressurize the fuel system. The inability to pressurize the fuel system may cause the fuel system sensor 38 to indicate a fault, which in turn can cause light to be illuminated (e.g., the check engine light). The remote service method can adjust one or more the fuel system sensor 38 that can communicate the fault to the control module 34. Adjusting or disabling the fuel system sensor 38 can clear the faults in the control module 34 and turn off the interior indicator lights 44 during the time required to replace the fuel cap 24. It can be appreciated that adjusting the fuel system sensor 38 can include increasing or decreasing sensitivity and/or detection thresholds.

In step 452, control sets vehicle parameters. The vehicle parameters are specific to each vehicle model but may include, for example, setting the engine to a predetermined speed, turning on/off certain engine accessories or selecting a certain transmission gear. In step 454, control adjusts the fuel system sensor 38. In step 456, control determines whether the adjusted fuel system sensor still produces a fault signal. When control determines there is still the fault signal, control continues with step 458. When control determines there is no longer a fault signal, control continues with step 460. In step 458, control determines whether continued fault signal is necessary. Continued detection may be warranted, for example, when previous adjustments of the fuel system sensors still show low pressure or the presence of the fault signal. When control determines that continued detection is not necessary control continues with step 460. When control determines that continued detection is necessary, control loops back to step 452.

In step 460, control determines whether the fuel system sensors should be adjusted back to previous threshold levels or enabled. When control determines that the fuel system sensors should be adjusted or enabled, control continues with step 462. When control determines that the fuel system sensors should not be adjusted or enabled, control ends and resumes with step 110, as shown in FIG. 2. It can be appreciated that the fuel system sensors can be adjusted or enabled when the remote service procedure failed, which may mean that low pressure in the fuel system may be due to reasons other than the missing fuel tank cap. In step 462, control adjusts or enables all fuel system sensors disabled in step 454. After step 462, control ends and resumes with step 110, as shown in FIG. 2.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A method of remotely servicing a vehicle component, comprising:

contacting a remote service center through a telematic module on a vehicle;

diagnosing remotely a vehicle issue; and servicing remotely said vehicle issue by actuation of a vehicle component based on communication with said remote service center to service said vehicle issue.

2. The method of claim 1 further comprising communicating with a driver.

3. The method of claim 1 further comprising detecting a control module fault through the telematic module.

4. The method of claim 1 further comprising creating a session log and transmitting said session log to said remote service center.

5. The method of claim 1 further comprising setting a vehicle parameter to facilitate one of said diagnosing and servicing remotely said vehicle issue.

6. The method of claim 5 wherein said step of setting said vehicle parameter includes one of setting an engine speed, selecting a transmission gear, adjusting a vehicle accessory and combinations thereof.

7. The method of claim 1 wherein said step of servicing includes actuating a throttle body at a predetermined frequency and magnitude.

8. The method of claim 7 wherein said step of servicing includes adjusting said predetermined frequency and magnitude at which said throttle body is actuated based on a previous remote service procedure.

9. The method of claim 1 wherein said step of servicing includes actuating a engine gas recycling valve at a predetermined frequency and magnitude.

10. The method of claim 1 wherein said step of servicing includes actuating a purge valve at a predetermined frequency and magnitude.

11. The method of claim 1 wherein said step of servicing includes actuating a transmission solenoid at a predetermined frequency and magnitude.

12. The method of claim 1 wherein said step of servicing includes cycling an interior indicator light.

13. The method of claim 1 wherein said step of servicing includes heating a hot-wire airflow meter, wherein said heating is adapted to burn off debris, corrosion, containments and combinations thereof.

14. The method of claim 1 further comprising adjusting a fuel system sensor to determine whether a fuel tank cap is missing.

15. A method of servicing a vehicle component by contacting a remote service center though a telematic module, comprising:

communicating a fault to the remote service center through the telematic module;

diagnosing remotely a vehicle issue based on said fault; and executing a remote service procedure to remotely service said vehicle issue by activation or deactivation of a vehicle component based on communication with said remote service center to service said vehicle issue.

16. The method of claim 15 further comprising diagnosing remotely a vehicle issue based on communication between the remote service center and a driver.

17. The method of claim 15 further comprising creating a session log and transmitting said session log to the remote service center.

18. A control system that communicates with a remote service center to perform a remote service procedure, the control system comprising:

a telematic module that communicates with the remote service center to remotely diagnose a vehicle issue; and a control module that executes a remote service procedure to service said vehicle issue based on communication with said remote service center through said telematic module;

wherein said control module continues to adjust at least one of magnitude, frequency, and sensitivity of a vehicle component until said vehicle issue is resolved.

19. The system of claim 18 wherein said remote service center communicates with a vehicle user through said telematic module.

20. The system of claim 18 wherein said control module communicates faults to said remote service center through said telematic module.

21. The system of claim 18 wherein said control module creates a session log and transmits said session log to the remote service center.

22. The system of claim 18 wherein said control module sets a vehicle parameter to facilitate one of diagnosis and service of said vehicle issue.

23. The system of claim 18 wherein the remote service center communicates with said control module through said telematic module to set a vehicle parameter.

24. The system of claim 18 wherein the vehicle parameter includes one of setting an engine speed, selecting a transmission gear, adjusting a vehicle accessory and combinations thereof.

25. The system of claim 18 wherein the remote service center communicates with said control module through said telematic module to actuate at a predetermined frequency and magnitude one of a throttle body, an engine gas recycling valve, a purge valve, and combinations thereof.

26. The system of claim 25 wherein the remote service center communicates with said control module through said telematic module to adjust said predetermined frequency and magnitude.

27. The system of claim 18 wherein the remote service center communicates with said control module through said telematic module to actuate a transmission solenoid at a predetermined frequency and magnitude.

28. The system of claim 18 wherein the remote service center communicates with said control module through said telematic module to cycle an interior indicator light.

29. The system of claim 18 wherein the remote service center communicates with said control module through said telematic module to service a hot-wire airflow meter, wherein said service includes heating that is adapted to burn off one of debris, corrosion, containments and combinations thereof.

30. The system of claim 18 wherein the remote service center communicates with said control module through said telematic module to adjust a fuel system sensor to determine whether a fuel tank cap is missing.

* * * * *